US011526943B1

(12) United States Patent
Donnelly et al.

(10) Patent No.: US 11,526,943 B1
(45) Date of Patent: Dec. 13, 2022

(54) DELAYED TRANSACTION MATCHING

(71) Applicant: IVAX, LLC, Wilmington, DE (US)

(72) Inventors: Brian P. Donnelly, New York, NY (US); Steven I. Givot, Spring, TX (US); John K. Kerin, Park Ridge, IL (US)

(73) Assignee: IVAX LLC, Wilmington, DE (US)

( * ) Notice: Subject to any disclaimer, the term of this patent is extended or adjusted under 35 U.S.C. 154(b) by 0 days.

(21) Appl. No.: 17/663,514

(22) Filed: May 16, 2022

Related U.S. Application Data

(60) Provisional application No. 63/267,767, filed on Feb. 9, 2022, provisional application No. 63/267,441, filed on Feb. 2, 2022.

(51) Int. Cl.
 *G06Q 40/04* (2012.01)
(52) U.S. Cl.
 CPC .................... *G06Q 40/04* (2013.01)
(58) Field of Classification Search
 CPC .................................................. G06Q 40/04
 See application file for complete search history.

(56) References Cited

U.S. PATENT DOCUMENTS

| | | | | |
|---|---|---|---|---|
| 10,303,530 | B1 * | 5/2019 | Givot | G06Q 40/04 |
| 2017/0024820 | A1 * | 1/2017 | Djurdjevic | G06F 16/2379 |
| 2020/0201670 | A1 * | 6/2020 | Ahlqvist | G06F 9/4881 |

FOREIGN PATENT DOCUMENTS

| | | | | |
|---|---|---|---|---|
| EP | 3779846 A1 * | 2/2021 | | G06F 17/18 |
| JP | 2006-529035 A * | 12/2006 | | G06Q 40/04 |

OTHER PUBLICATIONS

Aldrich et al.: Order Protection through Delayed Messaging, Mar. 3, 2019, pp. 1-59 (Year: 2019).*
Ke et al.: Optimizing Online Matching for Ride-Sourcing Services with Multi-Agent Deep Reinforvement Learning, Feb. 17, 2019, pp. 1-10 (Year: 2019).*

* cited by examiner

*Primary Examiner* — Bijendra K Shrestha
(74) *Attorney, Agent, or Firm* — Schwegman Lundberg & Woessner, P.A.

(57) ABSTRACT

System and techniques for delayed transaction matching are described herein. A received transaction request, that includes an original value used to match against another transaction request, has the original value modified to create a modified value that is less likely to match another transaction request. A data structure entry is written for the transaction request with corresponding value field in the entry including the modified value. After a time period, or a delay period, is elapsed, the entry is rewritten to change the modified value to the original value of the transaction request to end the delay applied to the transaction request.

26 Claims, 8 Drawing Sheets

Fig. 2E: Matching Engine – Process Cxl Request

DELAYED TRANSACTION MATCHING

CLAIM OF PRIORITY

This patent application claims the benefit of priority, under 35 U.S.C. § 119, to U.S. Provisional Application Ser. No. 63/267,441, titled "SYSTEM AND METHOD FOR DELAYING AN EXECUTABLE INSTRUCTION THAT WOULD OTHERWISE BE EXECUTABLE IMMEDIATELY UPON ARRIVAL AT AN EXECUTING SYSTEM WHILE RETAINING THE ABILITY OF THE INSTRUCTION TO BE EXECUTED DURING THE DELAY PERIOD UNDER LIMITED CONDITIONS" and filed on Feb. 2, 2022, and also claims priority to U.S. Provisional Application Ser. No. 63/267,767, titled "SYSTEM AND METHOD FOR DELAYING AN EXECUTABLE INSTRUCTION THAT WOULD OTHERWISE BE EXECUTABLE IMMEDIATELY UPON ARRIVAL AT AN EXECUTING SYSTEM WHILE RETAINING THE ABILITY OF THE INSTRUCTION TO BE EXECUTED DURING THE DELAY PERIOD UNDER LIMITED CONDITIONS" and filed on Feb. 9, 2022, the entirety of all are hereby incorporated by reference herein.

TECHNICAL FIELD

Embodiments described herein generally relate to computer networking and more specifically to delayed transaction matching.

BACKGROUND

Computer transactions are a set (e.g., sequence) of computer operations whereby the failure of any results in a failure of the transaction. For example, a transaction to update a database may include updating two records as part of a transaction. If the first record update succeeds and the second record update fails, the transaction has failed. In such cases, to maintain the integrity of the data, the change to the first record will be rolled back when the transaction fails. In general, transactions help to ensure that data-oriented resources are not permanently updated unless all operations within the transactional unit complete successfully.

Transactions may be initiated with a transaction request. A Transaction request may include initiation of one or more transactions in a message to a transaction processing system. Often, a transaction request is matched by the transaction processing system to a resource, or another transaction request, to complete the transaction. For example, a request to process video in a hardware accelerator may be accepted by the transaction processing system and held until a hardware accelerator becomes available and matched the transaction request. In this way, the transaction processing system arbitrates resource matching to the transaction requests that are received.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
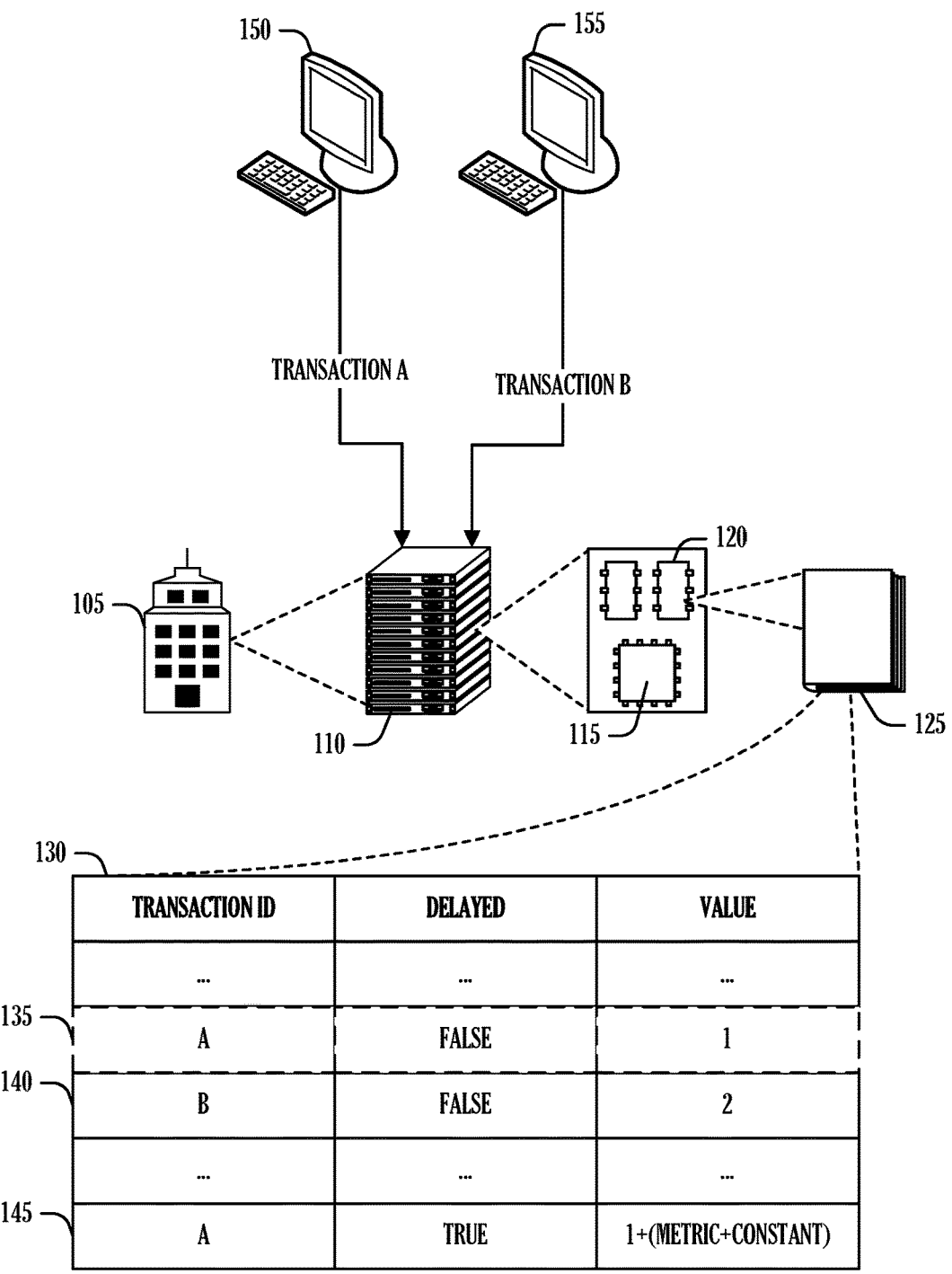
FIG. 1 illustrates an example of an environment including a system for delayed transaction matching, according to an embodiment.

Transaction resource matching to complete transactions in a consistent manner can lead to uneven resource allocation depending upon the circumstances. For example, if two client devices are attempting to use a server device to process video, and the two client devices have disparate connection speeds—e.g., the first client device connection has a latency half that of the second client device connection—a situation can arise in which the client device with a faster connection is serviced much more than the client device with a slower connection. In some cases, this result is acceptable—or even desirable in, for example, some cluster operations in which the speedier responding device should be serviced more often—and the result is unacceptable in other cases.

Request starvation is an example of a result that may occur when transaction requests are handled unevenly based on in-bound connection speed. Here, the slower connection devices may experience an inability to secure resources to complete transactions within a timeout period due to the greater number of transaction requests by the more speedily connected devices. Thus, the underserviced devices fail to make forward progress on workloads, impacting computational efficacy and user experience.

Some work has been performed to bring balance to such transaction processing systems. Generally, these techniques use an arbiter and a set of rules to help ensure a more even allocation of resources to transaction requests to complete transactions. These rules sets generally rely on several data points, such as process priority, request arrival time, time-in-queue, etc. to even out requesting entities and provide balanced, as defined by the rule set, access to transaction resources. These arrangements typically involve substantially processing complexity while being difficult to set-up.

An alternative transaction processing technique may simply introduce a delay for new transactions in order to collect a batch of transactions that can then be processed (e.g., matched). In these examples, a specific delay queue may be used to hold these transactions for a specific delay period or until a threshold number of transactions is received. Although the complexity is less than those techniques discussed above, the use of the additional delay queue and processing of transaction quests in the queue does increase complexity over traditional transaction processing systems. Further, a question of priority may be raised; how will high priority transaction requests be handled in the delay queue? Under a naïve implementation, high-priority requests may languish in the delay queue where an abbreviated matching delay would be more efficient.

To address the use noted above, delayed transaction matching within a queue may be used. In the following examples, transactions requests are matched to resources based on a metric in the transaction request. For example, if the transaction request is a data write, the metric may be the storage to complete the write. In transactions of these types, the requests may be placed into a queue and ordered based on the metric. When a resource becomes available, the transaction requests are matched to the resources and completed based on the ordering in the queue. In this context, transaction matching may be delayed by temporarily modifying the metric to delay the matching. Thus, if the write transaction request included a minimum and maximum storage as the metric, the maximum storage plus a predefined value may be used as the modified metric in order to make it more difficult to match the request within a delay period. Then, after the delay period has elapsed, the original metric of the transaction quest is replaced and used to sort the transaction request against resources under the original specification of the transaction request.

Modifying the transaction request matching metric in-queue provides several advantages over other techniques. For example, not only does eliminating the dedicated delay queue simplify the design, the one-queue technique enables matching of the transaction request early under certain circumstances, such as with a high-priority transaction request. Here, even though the metric is modified based on the delay, the metric may still match given an appropriate resource availability. However, with most transaction requests, the modified metric enables a more balanced allocation of transaction resources to complete transactions across devices with varying connection capabilities. Additional details and examples are described below.

FIG. 1 illustrates an example of an environment including a system 110 for delayed transaction matching, according to an embodiment. As illustrated, a first client device 150 and a second client device 155 are transmitting transaction requests to the system 110 (e.g., a node) in a data center 105. The node 110 includes processing circuitry 115 (e.g., a processor, accelerator, etc.) and memory 120. The memory 120 house some or all of a data structure 125 representing a matching queue 130.

The matching queue 130 represents a simplified view of such a queue, including a transaction identifier (ID), a delayed field to indicate whether the given transaction request is delayed, and a metric (e.g., value) used to sort transactions in the matching queue 130. In the illustrated example, the value field orders the transactions. Thus, if transaction A were not delayed, as illustrated in entry 135 (e.g., record), transaction A would be matched, and thus completed, before transaction B, illustrated in entry 140. However, when transaction A is delayed, as illustrated in entry 145, the value field for entry 145 is modified to sort lower in the matching queue 130. Thus, the entry 145—the delayed transaction A—sorts lower than the entry 140 for transaction B, resulting in transaction A being matched after transaction B.

The illustrated arrangement demonstrates several advantages over other techniques, including the use of a single matching queue 130, rather than using additional delay queues. Further, it is clear that the value field is modified, but there need not be exclusion of the delayed transaction A from matching. Thus, if during the delay period there is a great need for transaction A—where great need is measured by meeting the modified value field—the entry 145 may be matched to complete the transaction. The following discuss the operation of the node 110, and more specifically the processing circuitry 115 of the node 110, to implement delayed transaction matching.

The processing circuitry 115 is configured to receive a first transaction request for a transaction (e.g., transaction A). This first transaction request includes an original value used to match against another transaction request. For example, if the transaction request is a request for bandwidth, the value is the amount of bandwidth requested. In this example, in general, the smaller the bandwidth request, the more likely that bandwidth will be available to complete the transaction. Thus, the value will sort higher than other transaction requests for greater bandwidth. However, the value may be anything that represents a metric of the exchange attempted by the transaction. Other examples may include energy or other commodities, securities, etc.

Once the first transaction request is received, the original value (e.g., the value provided in the transaction request) is modified based on a predefined delay to create a modified value. The predefined delay is the amount of time the transaction is delayed; however, an absolute time may not be specified. That is, the delay may be a number of clock cycles, an average transaction count, etc., rather than time elapsed on a clock. Thus, for example, the results of adhering to the predefined delay may not equal each other. Thus, in an example, if an average time to match the value is one second, and the predefined delay is five seconds, an addition of a constant that results in an average matching timing of five seconds or greater may be added to the value to create the modified value. This will, on average, ensure a greater than five second delay in matching the transaction request. Alternatively, the modified value is set such that no match is likely. As noted below, the modified value may be replaced with the original value after the predefined delay has expired, thereby pushing the transaction request to be matched after the predefined delay.

The processing circuitry 115 is configured to write an entry to a data structure for the transaction request. Here, the entry includes a value field into which the modified value is placed when the entry is written. In an example, the value field is used to sort transaction requests in the data structure. In an example, writing the entry in the data structure for the transaction request includes writing true in a delay field of the entry. As illustrated, the data structure is the matching queue 130. Thus, the entry 145 has the modified value (1+metric+constant) in the value field. Also, the entry 145 has true marked in the delay field. This is in contrast to the entry 135—for the same transaction A request—illustrating what the fields would include without the value modification based on the predefined delay.

The processing circuitry 115 is configured to replace the modified value in the value field of the entry with the original value in response to expiration of a time period based on the predefined delay. Here, the predefined delay is managed via an external timer. By restoring the original value transmitted as part of the transaction request when the timer has expired, the transaction request will then be able to be matched upon its intrinsic merits after the delay has expired. In an example, where the entry in the data structure had true written in the delay field of the entry, replacing the modified value in the value field of the entry with the original value in response to expiration of a time period based on the predefined delay includes writing false to the delay field of the entry. In this example, the entry 135 represents the state of the transaction request for transaction A after the processing circuitry 115 replaced the modified value and delayed field from the entry 145.

The processing circuitry 115 is configured to match the transaction request to a second transaction request based on the value field of the entry. Thus, the matching queue 130 provides the value field upon which entries are sorted and matched to other transaction requests. Here, the match may occur on the modified entry (e.g., entry 145) or the restored entry 135. However, as noted above, the modified value in the value field will make the matching of the entry 145 unlikely during the predefined delay period. Such matches generally will exhibit some significant need for the resources represented in the entry 145. Again, this enables some high priority matches to be made that are generally not available using techniques with dedicated delay queues. Accordingly, the modified value (e.g., entry 145) is less likely to match another transaction request than the original value (e.g., entry 135). In an example, the original value is a first number, and the modified value is a second number that is lower priority than the first number. In this context, lower-priority entails a number less likely to match. Thus, if a lower number is more likely to match—as is the case in selling a good or trying to allocate memory—the second number is larger than the first number. That is, in this example, smaller number match more easily than larger numbers. However, in other examples, the opposite may be true, and thus the ease of matching is reversed.

In an example, the second number is based on a delay number defined by the predefined delay. In an example, the second number is the delay number combined with the first number. In an example, the second number is the delay number. In an example, the delay number is computed from a constant and a metric derived from transaction requests in the data structure. This last example is illustrated in entry 145. The metric may be the result any number of techniques to characterize the value from the transaction request. Examples may include an average, a maximum or minimum possible value, a step between discrete possibilities for the value, etc. Thus, the delay number may include the value plus a maximum value+the constant. This ensures that the modified value is beyond what is generally available for matching.

In an example, the transaction requests have one of two types. In this example, the metric derived from the transaction requests the data structure is one of two metrics that correspond to the two types. In an example, a first metric of the two metrics that corresponds to the first type of the two types is a maximum value of a value field for a transaction request of the second type of the two types. In an example, the constant is added to the first metric to produce the delay number. Using buying and selling as examples of transaction types, it is evident that a sell transaction type will use the maximum metric and the buy transaction type will use the minimum metric. In this way, it is less likely that these two transaction types will be matched. In an example, a second metric of the two metrics that corresponds to the second type of the two types is a minimum value of a value field for a transaction request of the first type of the two types. Here, the metric is based on the relationship between the two transaction types. Thus, in a buy-sell environment, the buy transaction requests are related to sell transaction requests, and thus the metric may be based on the other type of transaction to help ensure that transaction requests are not matched on the modified value. In an example, the constant is subtracted from the second metric to produce the delay number.

The processing circuitry 115 is configured to execute the transaction using the first transaction request and the second transaction request in response to matching the first transaction request to the second transaction request. Thus, the processing circuitry 115 uses the single matching queue 130 to match transaction requests whether the transaction request is delayed (e.g., entry 145) or not (e.g., entry 135). As noted above, this arrangement provides several advantages over other techniques. For example, the reduction in data structures—such as eliminating delay queues—provides for a more efficient use of the memory 120 or other computational resources. Further, because the transaction requests are located in a single data structure, matching may be made, even on delay transaction requests, under appropriate conditions. This enables the implementation of high-priority matching, or the like, in the single data structure without complicated priority queue handling procedures.

FIGS. 2A-2E illustrate operations of a transaction matching system with delay, according to an embodiment. The discussion with regard to FIGS. 2A-2E use financial instrument transactions as an example of computer transactions that can benefit from delayed transaction matching. Financial instrument transactions such as automated handling of orders to buy or sell financial instruments including, but not limited to, equity securities, options, government debt securities, corporate debt securities, foreign exchange (currency), futures contracts, and options on futures contracts—have been evolving for the past two decades. The technological advances have typically resulted in manual trading being replaced by automated trading including, but not limited to, matching of buyers and sellers employing sophisticated order types and the use of fully automated matching systems to manage the execution priority of these orders, the limitations and restrictions of the terms of each order, and the actual matching of each buyer with each seller based on rules that are particular to the regulatory framework in which the matching system operator works and the rules of the matching system operator.

As the matching of buyers and sellers became more automated, traditional liquidity providers (e.g., specialists, market makers, floor traders, OTC traders, etc.) have given way to automated liquidity providers who employ electronic systems to place orders to buy and sell securities. Collectively, today's markets rely largely on automated liquidity providers to be present to take the other side of a trade when a competitive buyer or seller enters the market.

Financial incentives have been present for electronic market makers. The so-called Maker/Taker model is a common incentive scheme in which the party taking liquidity pays a fee to the matching system operator and the operator pays a portion of that fee to the party making liquidity as a financial incentive for the provider to continue doing so. By way of example, a stock exchange may charge a fee of $0.0030 per share matched to the liquidity taker and pay $0.0020 per share matched of that to the liquidity provider—pocketing the difference of $0.0010 per share matched as its net revenue for operating the matching system.

Because of intense competition among trading venues, almost any financial instrument that is traded on an electronic matching system is either traded in multiple trading venues or has a derivative relationship with another financial instrument that is electronically traded somewhere. For this reason, the pricing of almost any financial instrument will vary as the price of the same or a related financial instrument changes in another trading center. These interrelationships have led to a "speed war" that is fought among market participants. In some instances, a market participant is trying to be the first to recognize the change in the price of a financial instrument in one trading venue and execute a trade in the same financial instrument in another trading venue. In other instances, a market participant is trying to be the first to recognize the change in the price of a financial instrument in one trading venue and execute a trade in a related financial instrument in the same or a different trading venue. These efforts may be part of a "latency arbitrage" strategy. Latency arbitrage can be described as the practice of exploiting disparities in the pricing of related financial instruments that are being traded in the same or different markets by taking advantage of the time it takes to access and respond to market information. For the purpose of this document, we use the term "latency arbitrageur" to describe a Liquidity taker who employs a successful latency arbitrage strategy by shooting orders to take liquidity from a contra party victim that has been unable to access and respond to the same market information fast enough to modify the liquidity it is providing.

One consequence of a successful latency arbitrage strategy includes the latency arbitrageur extracting an economic rent from the liquidity provider who, although highly automated, does not respond to the same changes in market information as quickly as the latency arbitrageur. To avoid paying this economic rent to the latency arbitrageur, some liquidity providers respond by attempting to beat the latency arbitrageur in the "speed war." However, this can be very costly, and—even after committing significant resources to be faster—the liquidity provider may not succeed or may succeed for only a period of time after which the latency arbitrageur invests further and becomes faster yet again. Other responses of the victim liquidity provider can include providing liquidity at less competitive prices, providing less size at the same price, or ceasing to provide liquidity in an attacked financial instrument altogether. The impact of any of these responses is a reduction of liquidity in the marketplace.

The solutions that have been proposed to address latency arbitrage attacks typically involve preventing the immediate execution of some or all orders (e.g., transaction requests) that would take liquidity by placing those orders in a queue for some brief period of time. While in the queue, the orders are ineligible to be matched and, therefore, cannot provide liquidity. In contrast, the systems and techniques described herein provide a solution that delays the immediate execution of the order without placing it in a delay queue. Instead, the order is repriced (e.g., the value of the transaction quest is modified) to prevent it from taking liquidity during the delay period. The order is then placed in the resting order book (e.g., entry 145 in the data structure 125) where the order is eligible to match against certain orders. When the delay period has expired, the order becomes eligible to match based on its limit price without restriction (e.g., entry 135).

In the context of financial instrument transactions, a Delayed Order is treated as a Sliding Order during a Delayed Execution for Takers (DEFT) Delay Period (e.g., predefined delay). In an example, a delayed buy or sell order is immediately accepted by the matching system, the order's Working Price (the price which limits its ability to be matched) is set to one Minimum Price Interval (MPI) below for a buy order or above for a sell order the current Market Best Offer (Market Best Bid). The order with its modified Working Price is placed in the resting order book where it is immediately available to be matched against sell orders in the case of buy orders or buy orders in the case of sell orders.

In these examples, the Delayed Order continues to be treated like a Sliding Order until one of five events occurs. The first possible event is the complete execution of the Delayed Order. The second possible event is the complete cancellation of any unexecuted portion of the Delayed Order. The third possible event is the modification of the Displayed Order using a cancel/replace request. The fourth possible event occurs when a change in the Market Best Bid or Market Best Offer results in the Delayed Order's Working Price being modified to be equal to the Delayed Order's limit price which ends the DEFT Delay. The fifth possible event occurs if any portion of the Delayed Order remains unexecuted and its DEFT Delay Period expires, in which case the order is released from the DEFT Delay by replacing the Delayed Order with a modified order with a Working Price set to its limit price and immediately submitting the modified order to the matching engine to be matched or added to the resting order book.

Unlike other techniques (e.g., using a dedicated delay queue), the Delayed Order would be immediately eligible to be matched against a delayed contra side resting order whose DEFT Delay Period has expired and whose limit price equals or crosses the Working Price of the Delayed Order. The feature improves on previous uses of delay queues by enabling the Delayed Order to provide liquidity during the DEFT Delay Period. Moreover, the techniques described herein levels the playing field between high tech latency arbitrageurs and slower liquidity providers, giving slower liquidity providers a reasonable opportunity to adjust the price and quantity of their orders to reflect the most recent market conditions.

The following terms are applicable to the discussion of FIGS. 2A-2E:

| | |
|---|---|
| Delayed Order | An order which is currently subject to the DEFT Delay. (Delayed = TRUE) A Delayed Order is treated as a Sliding Order. When the matching system determines that a Delayed Order should no longer be delayed, it is no longer treated as a Sliding Order unless it was originally submitted as a Sliding Order. |
| DEFT Delay Period | The time between the initial time of receipt of a new order by the matching system or a replacement order is created by the matching system (ReceiptTime) and the time when a that order is eligible to be released and take liquidity from the Resting order book. For a given implementation, the length of the DEFT Delay Period may be fixed, random, or a function of various parameters. Delayed Orders have a parameter value of Delayed = TRUE. When the DEFT Delay Period expires, the matching system releases the Delayed Order from the DEFT Delay and changes Delayed = FALSE. Orders which are never delayed have a parameter value of Delayed = FALSE. |
| DEFT Delay Criteria | A set of criteria which is used to determine whether an instruction is eligible to be processed immediately or subject to the DEFT Delay. |
| Delayed Execution For Takers (DEFT) | An intentional temporary modification to order processing which is applied to an order when a set of DEFT Delay Criteria is met. The Delayed parameter of an order determines whether the order is currently being delayed (Delayed = TRUE). |
| Inbound Message Queue (IMQ) | A first-in-first-out (FIFO) queue of all messages being sent to the matching system from outside the matching system for a given financial instrument including, but not limited to, new orders, cancel requests, and cancel/replace requests. |
| Limit price | The maximum or minimum (depending upon the type of transaction) price of an order at which a buy (sell) order may be matched. The matching system uses an order's limit price to determine the Working Price of the order. |
| Minimum Price Increment (MPI) | The MPI is the minimum price difference permitted for an order. For example, in the U.S. listed equities markets, orders priced below $1.00 per share have an MPI of $0.0001 while orders priced at or above $1.00 per share have an MPI of $0.01. |
| Market Best Bid (MBB) | The highest published bid price of any marketplace which the matching system is obligated to protect against trading through. For example, in the US listed equities market, the MBB is called the National Best Bid (NBB). If the matching system is not obligated to protect quotations published by any other trading center, the MBB is the highest Working Price of any buy order in the resting order book. If the highest Working Price of any buy order in the resting order |

| | |
|---|---|
| | book changes, MBB is immediately reevaluated to reflect that change. |
| Market Best Offer (MBO) | The lowest published offer (ask) price of any marketplace which the matching system is obligated to protect against trading through. For example, in the U.S. listed equities market, the MBO is called the National Best Offer (NB 0), If the matching system is not obligated to protect quotations published by any other trading center, the MBO is the lowest Working Price of any sell order in the resting order book. If the lowest Working Price of any sell order in the resting order book changes, MBO is immediately reevaluated to reflect that change. |
| ReceiptTime | The time that a new (replacement) order was first received (created) by the matching system. |
| ReleaseTime | A Delayed Order's ReleaseTime is the sum of DEFT Delay Period set by the matching system for each order and the order's ReceiptTime. |
| Sliding Order | The matching system modifies the Working Price of a Sliding Order when circumstances arise which cause the matching system to reevaluate the Sliding Order's Working Price. When the Working Price of a Sliding Order to buy (sell) is reevaluated, the matching system sets the Working Price to the MBO (MBB) minus (plus) one MPI.<br>If there is no change to the Working Price, no change is made to the ranking of the Sliding Order in the resting order book.<br>If the Working Price changes as a result of the reevaluation, the Sliding Order is cancelled at its previous Working Price and submitted to the matching system ranked at its new Working Price. |
| TimeNow( ) | TimeNow( ) is a function which returns the current system time of day to the precision required by the implementation (e.g., milliseconds, microseconds, or nanoseconds). |
| Working Price | The maximum (minimum) price at which the matching system may match a buy (sell) order in the Resting order book. |

FIGS. 2A-2E illustrate the application of a generic set of DEFT Delay Criteria which delay all liquidity taking orders. However, the DEFT Delay Criteria might delay only certain liquidity taking orders or might delay orders based on other criteria such as order size.

The length of the intentional delay imposed is the DEFT Delay Period, can be either a fixed amount of time or a variable amount of time calculated based on the specific implementation of DEFT. For simplicity, FIGS. 2A-2E illustrate the DEFT Delay Period as a fixed amount of time.

DEFT may be implemented within the framework of a matching system that includes a network to connect the trading center with order senders who send messages to the trading center using the network, an automated matching system dispatcher that places those messages into a FIFO Inbound Message Queue, a resting order book, and an automated matching system that processes and removes messages from the Inbound Message Queue processes those messages against its resting order book.

As mentioned above, DEFT delays an order meeting the DEFT Delay Criteria that would take liquidity if the order were immediately processed by the matching system. A Delayed Order is treated as Sliding Order during its DEFT Delay Period. When the DEFT Delay Period has ended, a Delayed Order is released from the DEFT delay and is no longer subject to further delay. When a Delayed Order is released, it is treated as a limit order unless it was originally submitted as a Sliding Order.

When an order is released, the order may immediately match against any order in the resting order book, subject only to the Working Prices of the two orders.

In an example, cancel requests are not intentionally delayed, nor are they affected by whether the order to be cancelled is currently delayed. When the matching system receives a cancel request from the Inbound Message Queue, it immediately cancels any unexecuted portion of the order.

In an example, cancel and replace (cancel/replace) requests are not intentionally delayed, nor are they affected by whether the order to be cancelled is currently delayed. When the matching system receives a cancel/replace request from the Inbound Message Queue, it immediately cancels any unexecuted portion of the order. In an example, the matching system creates a proposed replacement order. If the sole effect of the replacement order is to reduce the unexecuted quantity of the order being replaced, that change is made immediately, does not affect the delayed stated of a Delayed Order, and there is no other change to the state or ranking of the order being replaced. However, in all other cases, the matching system treats the replacement order as a new order, sets the ReceiptTime to the current time, and determines whether the replacement order is subject to the DEFT Delay.

Figure 2A:
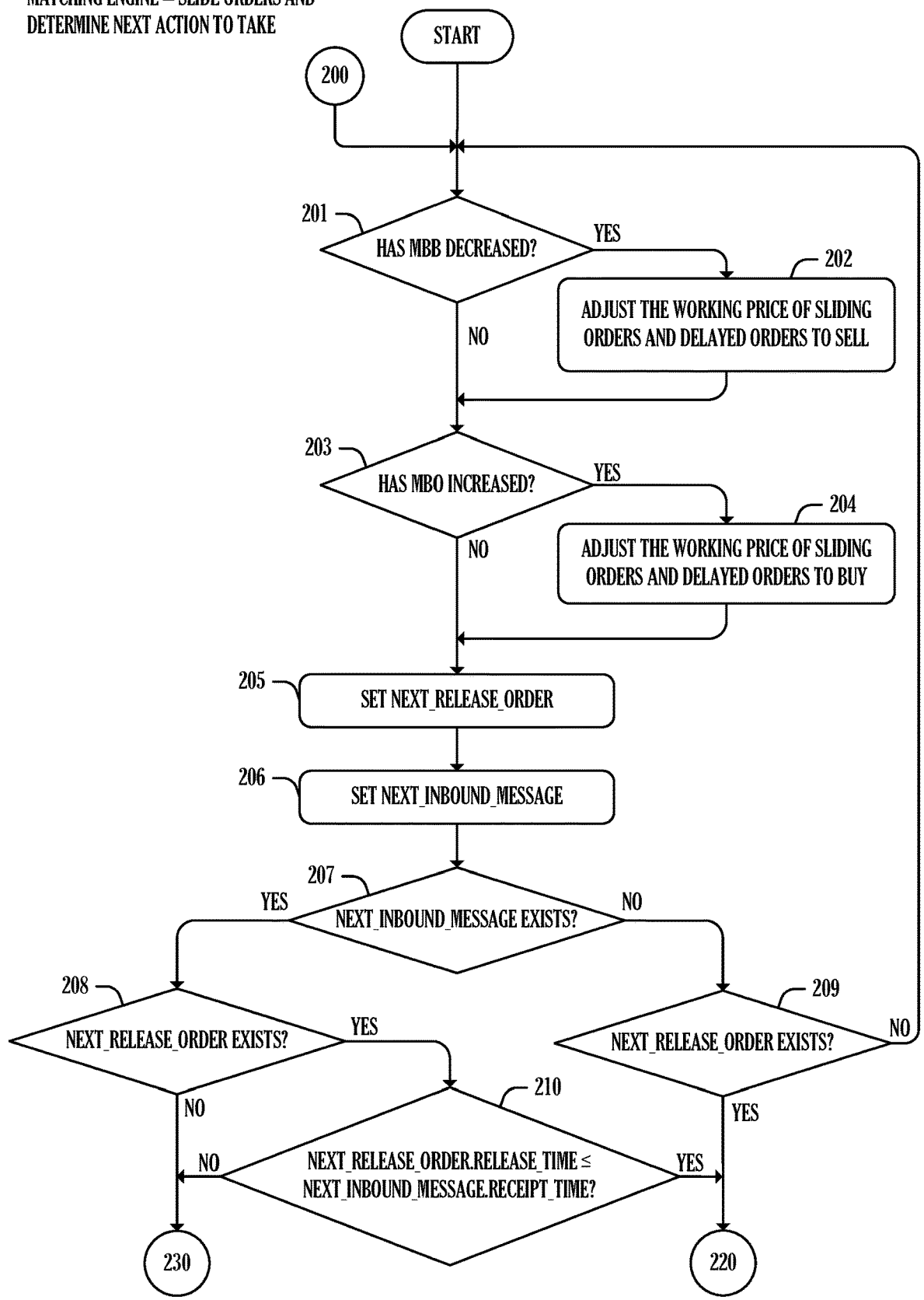
FIGS. 2A-2E illustrate operations of a transaction matching system with delay, according to an embodiment.

FIG. 2A is a flowchart that illustrates how the matching system updates any Sliding Orders or Delayed Orders to reflect changes in the Market Best Bid (MBB) or the Market Best Offer (MBO). The matching system then determines whether there is a Delayed Order that no longer should be delayed (e.g., released) or whether there is a Message to process in the Inbound Message Queue (IMQ). If both exist, the matching system determines which to process next.

Entry point 200 is the output from traditional order processing after the processing of an order is complete. Processing continues at decision 201.

At decision 201, the matching system determines whether the MBB has decreased since the last time decision 201 was initiated. A decrease in the MBB is a circumstance in which (1) every Delayed Order on the sell side of the resting order book must have its Working Price decreased, and (2) one or more Sliding Orders on the sell side of the Resting order book may need to have their Working Prices decreased. If the MBB has decreased, processing continues at operation 202. Otherwise, processing continues at decision 203.

At operation 202, Sliding Orders and Delayed Orders on the sell side of the resting order book are evaluated. If the Working Price of each such order is not equal to the order's limit price, then the Working Price is changed to the greater of the order's limit price or MBB plus MPI (Minimum Price Increment for the asset). These changes will never create circumstances in which the matching system could now match the modified order with an order in the resting order book. If this results in the Working Price of a Delayed Order being set to the order's limit price, the order's Delayed value is set to FALSE, and the order ceases to be a Delayed Order. Processing continues at decision 203.

At decision 203, the matching system determines whether the MBO has increased since the last time decision 203 was initiated. An increase in the MBO is a circumstance in which (1) every Delayed Order on the buy side of the resting order book must have its Working Price increased, and (2) one or more Sliding Orders on the buy side of the resting order book may need to have their Working Prices increased. If the MBO has increased, processing continues at operation 204. Otherwise, processing continues at operation 205.

At operation 204, Sliding Orders and Delayed Orders on the buy side of the resting order book are evaluated. If the Working Price of each such order is not equal to the order's limit price, then the Working Price is changed to the lesser of the order's limit price or MBO minus MPI (Minimum Price Increment for the asset). These changes will never create circumstances in which the matching system could now match the modified order with an order in the resting order book. If this results in the Working Price of a Delayed Order being set to the order's limit price, the order's Delayed value is set to FALSE, and the order ceases to be a Delayed Order. Processing continues at operation 205.

At operation 205, the matching system determines whether there exists one or more Delayed Orders in the resting order book for which the DEFT Delay Period has expired. These orders are ripe to be released from the DEFT Delay. If there are any Delayed Orders which are ripe to be released from the DEFT Delay, NextReleaseOrder is set to identify oldest such order—the order with the oldest ReleaseTime. If no Delayed Order is ripe for release, then NextReleaseOrder is set to NULL to indicate that no such order exists. Processing continues at operation 206.

At operation 206, the matching system determines whether there is at least one message in the Inbound Message Queue (IMQ). If there is at least one such message, NextInboundMessage is set to identify that Message. Otherwise, NextInboundMessage is set to NULL to indicate that no such message exists. Processing continues at decision 207 where the matching system begins to apply the rules in Table 1 to determine how to proceed.

TABLE 1

| State | Next Operation | NextRelease Order exists | NextInbound Message exists | NextReleaseOrder.ReleaseTime ≤ NextInboundOrder.ReceiptTime |
|---|---|---|---|---|
| A | 201 | FALSE | FALSE | N/A |
| B | 220 | TRUE | FALSE | N/A |
| C | 230 | FALSE | TRUE | N/A |
| D | 220 | TRUE | TRUE | TRUE |
| E | 230 | TRUE | TRUE | FALSE |

At decision 207, the value of NextInboundMessage is examined to determine whether there is a message in the IMQ. If a message exists (State C, State D, or State E), processing continues at decision 208. Otherwise (State A or State B), processing continues at decision 209.

At decision 208, the value of NextReleaseOrder is examined to determine whether there is a Delayed Order that is ripe to release. If such an order exists, then there is a message in the IMQ, there is a Delayed Order that is ripe to release (State D or State E), and processing continues at decision 210. Otherwise, there is a message in the IMQ, there is no Delayed Order that is ripe to release (State C), and processing continues at entry point 230 on FIG. 2C.

At decision 209, the value of NextReleaseOrder is examined to determine whether there is a Delayed Order that is ripe to release. If such an order exists, then there is a Delayed Order that is ripe to release, there is no message in the IMQ (State B), and processing continues at entry point 220 on FIG. 2B. Otherwise, there is no message in the IMQ, there is no Delayed Order that is ripe to release (State A), and processing continues at decision 201.

At decision 210, both a Delayed Message ripe to release and a Message in the IMQ exist. The matching system must determine which of these to process to first. The NextReleaseOrder.ReleaseTime is compared with the NextInboundMessage.ReceiptTime. If the NextReleaseOrder.ReleaseTime is less than or equal to the NextInboundMessage.ReceiptTime, the matching systems will release the NextReleaseOrder processing the NextInboundMessage in the IMQ (State D), and processing continues at entry point 220 on FIG. 2B. Otherwise, the matching Engine will process the NextInboundMessage in the IMQ before releasing the NextReleaseOrder (State E), and processing continues at entry point 230 on FIG. 2C.

Figure 2B:
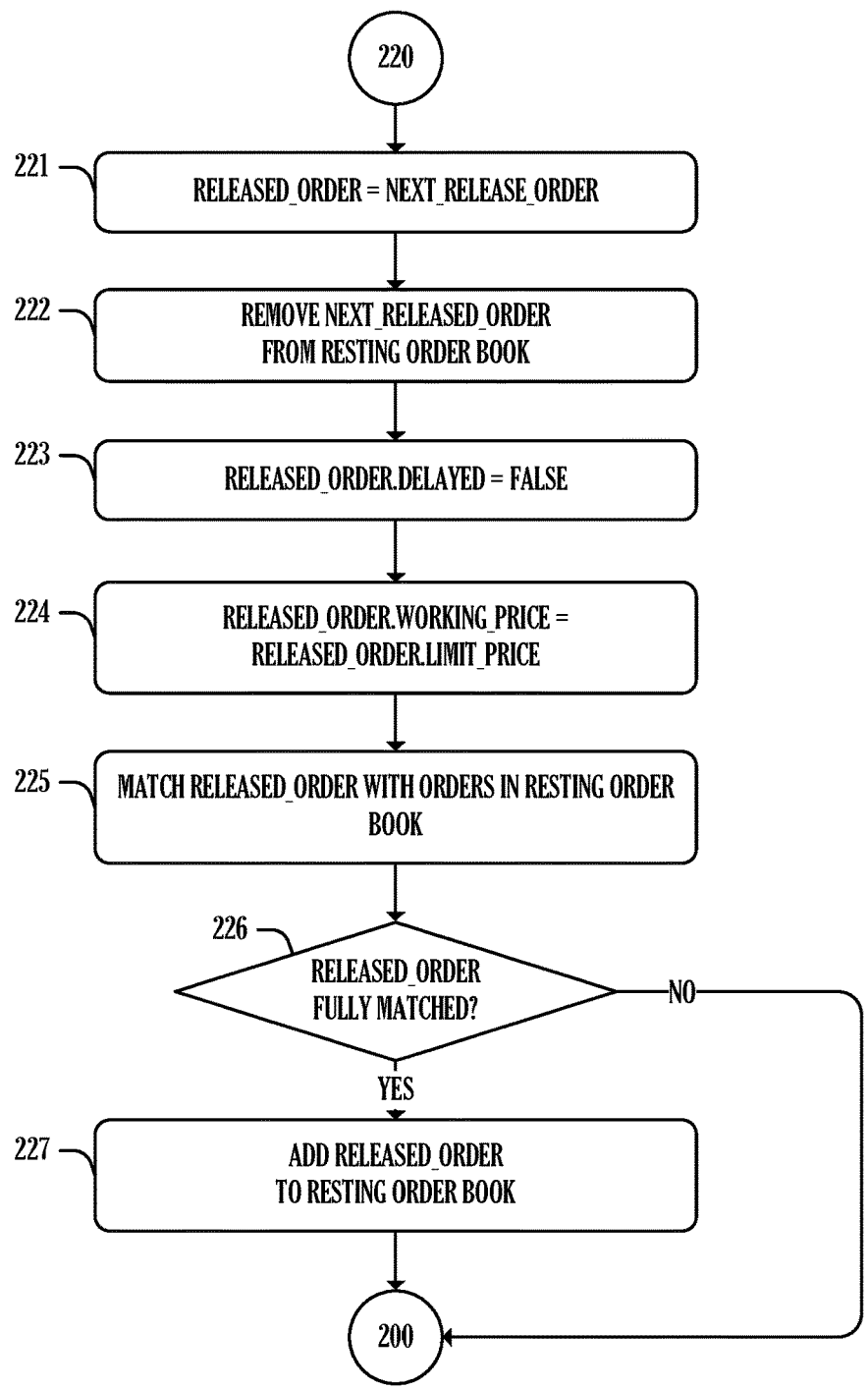

FIG. 2B is a flowchart which illustrates the activity of the matching system when the next action determined in FIG. 2A is to release a Delayed Order identified by NextReleaseOrder herein.

At operation 221, ReleasedOrder is set to the Delayed Order that is to be released. Processing continues at operation 222.

At operation 222, NextReleaseOrder is cancelled from the resting order book. Processing continues at operation 223.

At operation 223, ReleasedOrder.Delayed is set to FALSE to indicate that it is not a Delayed Order. Processing continues at operation 224.

At operation 224, ReleasedOrder's Working Price set to ReleasedOrder's limit price. Processing continues at operation 225.

At operation 225, ReleasedOrder is now ready to process as a new order against orders in the resting order book. Processing continues at decision 226.

At decision 226, a determination is made as to whether the ReleasedOrder is fully matched to an order in the resting order book. If yes, then processing continues with operation 227. If the ReleasedOrder is not fully matched, processing continues with entry point 200 on FIG. 2A.

At operation 227, the ReleasedOrder is added to the resting order book. Processing continues with entry point 200 on FIG. 2A.

Figure 2C:
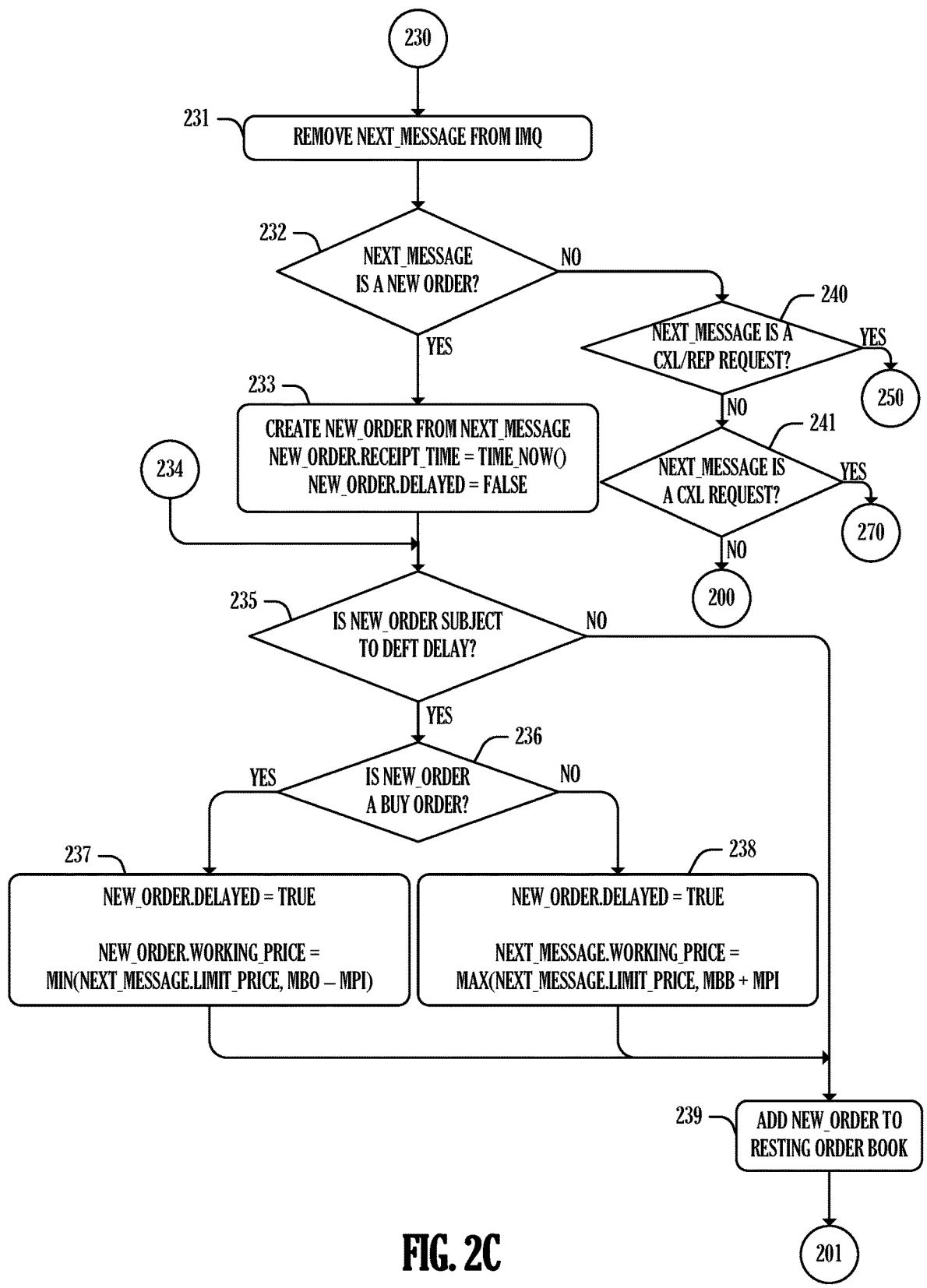

FIG. 2C is a flowchart which illustrates the activity of the matching system when the next action determined in FIG. 2A is to process the next message in the IMQ.

At operation 231, the matching system sets NextMessage to the next message in the FIFO Inbound Message Queue (IMQ) and removes that message from IMQ. Processing continues at decision 232.

At decision 232, the matching system determines whether NextMessage contains a new order. If NextMessage contains a new order, processing continues at operation 233. Otherwise, processing continues at decision 240.

At operation 233, the matching system creates a new order (NewOrder) from NextMessage. NewOrder's ReceiptTime is set to the current time (TimeNow( )). NewOrder.Delayed is set to FALSE. Processing continues at decision 235.

Figure 2D:
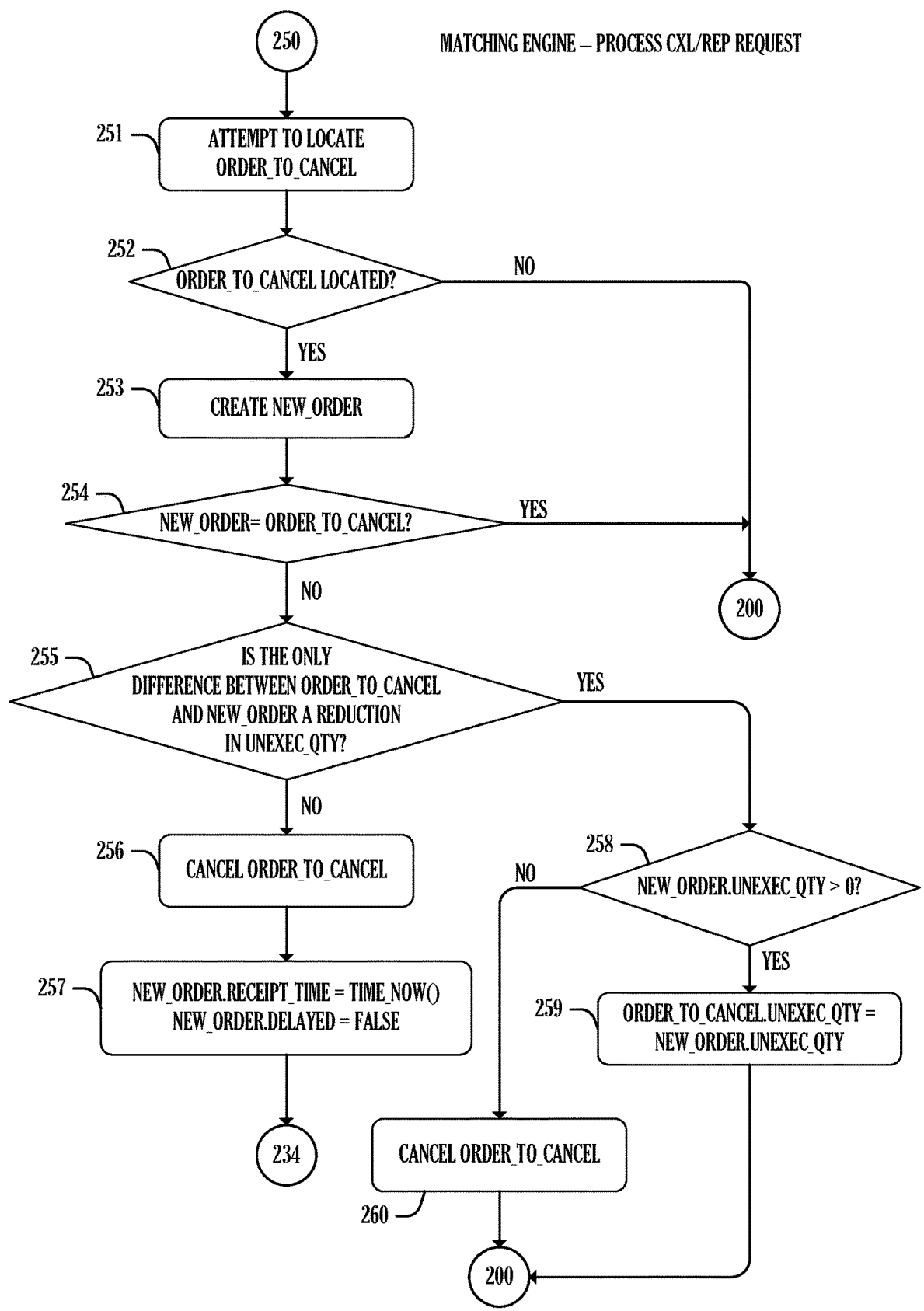

Entry point 234 provides a new replacement order created in FIG. 2D so that the replacement order will be evaluated to determine whether it is subject to the DEFT Delay. Processing continues at decision 235.

At decision 235, the matching system determines whether NewOrder is subject to the DEFT Delay. The DEFT Delay Criteria are used to make this determination. The DEFT Delay Criteria assure that NewOrder will be delayed if it would immediately match with any resting order in the resting order book. If NewOrder is subject to the DEFT Delay, processing continues at decision 236. Otherwise, processing continues at operation 239.

At decision 236, NewOrder is evaluated to determine whether it is a buy order or a sell order. If it is a buy order, processing continues at operation 237. Otherwise, it is a sell order, and processing continues at operation 238.

At operation 237, NewOrder is a buy order that will be delayed. NewOrder.Delayed is set to TRUE. New Order's Working Price is set to the lesser of NewOrder's limit price and the Market Best Offer (MBO) minus Minimum Price Increment for this instrument (MPI). This has the effect of adjusting the Working Price of NewOrder to the highest permitted price which would not result in an immediately match. Processing continues at operation 239.

At operation 238, NewOrder is a sell order which must be delayed. NewOrder.Delayed is set to TRUE. NewOrder's Working Price is set to the greater of NewOrder's limit price and the Market Best Bid (MBB) plus MPI. This has the effect of sliding the Working Price of NewOrder. Processing continues at operation 239.

At operation 239, NewOrder is added to the resting order book. The DEFT Delay Criteria examined at decision 235 or the Working Price of NewOrder which was set in operation 237 or operation 238 assure that NewOrder will not immediately match with any resting order in the resting order book. Therefore, no effort need be made to attempt to match NewOrder. Processing continues at decision 201 on FIG. 2A.

At decision 240, the matching system determines whether NextMessage is a cancel/replace request. If so, process continues at entry point 250 on FIG. 2D.

At decision 241, a determination is made as to whether NextMessage is a cancel request. If yes, then processing continues with entry point 270 on FIG. 2E. If NextMessage is not a cancel request, then processing continues with entry point 200 on FIG. 2A.

FIG. 2D is a flowchart which illustrates the activity of the matching system in process a cancel/replace request according to an embodiment.

At operation 251, the matching system attempts to locate the OrderToCancel. Processing continues at decision 252.

At decision 252, if the matching system was able to locate the OrderToCancel, processing continues at operation 253. Otherwise, the OrderToCancel is no longer present in the resting order book, no replacement order (NewOrder) should be created, and processing continues at entry point 200 on FIG. 2A.

At operation 253, the matching system creates the new replacement order (NewOrder) from the information contained in the cancel/replace requests and the information contained in OrderToCancel. Processing continues at decision 254.

At decision 254, if there is no difference between the OrderToCancel and NewOrder, nothing else needs to be done, and processing continues at entry point 200 on FIG. 2A.

At decision 255, if the only difference between the OrderToCancel and NewOrder is that NewOrder's unexecuted quantity is less than OrderToCancel's unexecuted quantity, processing continues at decision 258. Otherwise, processing continues at operation 256.

At operation 256, the matching system cancels OrderToCancel which removes it from the resting order book. Processing continues at operation 257.

At operation 257, NewOrder's ReceiptTime is set to the current time. NewOrder.Delayed is set to FALSE. NewOrder is treated as a new order which may require being delayed based on the DEFT Delay Criteria. Processing continues at entry point 234 on FIG. 2C.

At decision 258, if NewOrder has an unexecuted quantity greater than zero, processing continues at operation 259. Otherwise, processing continues at operation 260.

At operation 259, the cancel/replace request can be satisfied by setting the existing OrderToCancel's unexecuted quantity (and related parameters) to reflect the new NewOrder's unexecuted quantity (and related parameters). This allows OrderToCancel to be modified and left in place instead of OrderToCancel being removed from the resting order book, NewOrder added to the resting order book, and losing time priority (ranking) as a result. Processing continues at entry point 200 on FIG. 2A.

At operation 260, NewOrder does not have a remaining unexecuted quantity. Therefore, there is no reason to enter the NewOrder into the resting order book. The matching system cancels OrderToCancel, and processing continues at entry point 200 on FIG. 2A.

Figure 2E:
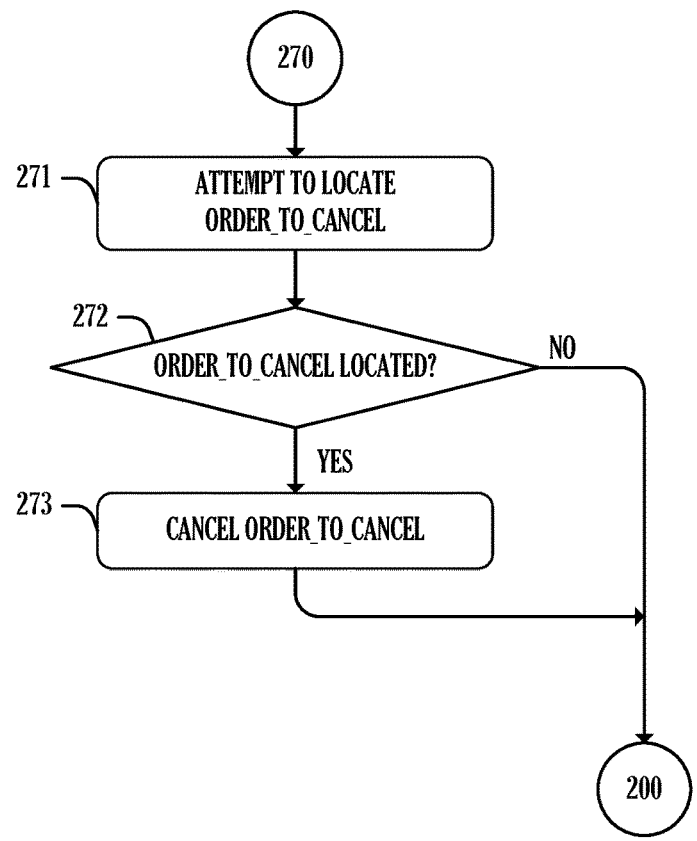

FIG. 2E is a flowchart which illustrates the activity of the matching system processing a cancel request according to an embodiment.

At operation 271, the matching system attempts to locate the OrderToCancel. Processing continues at decision 272.

At decision 272, if the matching system was able to locate the OrderToCancel, processing continues at operation 273. Otherwise, the OrderToCancel is no longer present in the resting order book and processing continues at entry point 200 on FIG. 2A.

At operation 273, the matching system cancels OrderToCancel which removes it from the resting order book. Processing continues at entry point 200 in FIG. 2A.

Figure 3:
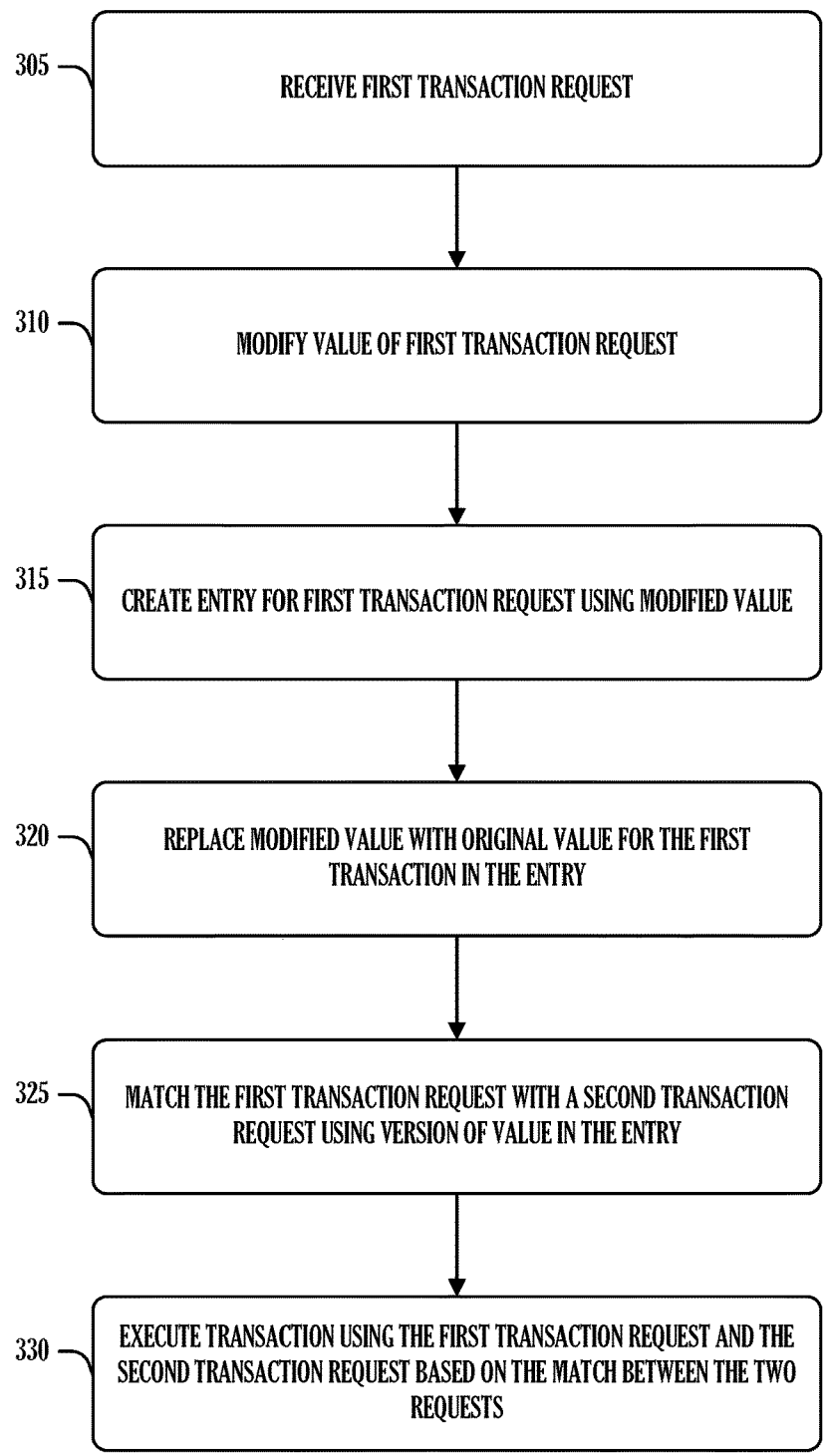
FIG. 3 illustrates an example of a method for delayed transaction matching, according to an embodiment.

FIG. 3 illustrates an example of a method 300 for delayed transaction matching, according to an embodiment. The operations of the method 300 are preformed by computer hardware, such as that described above or below (e.g., processing circuitry).

At operation 305, a first transaction request for a transaction is received. Here, the first transaction request includes an original value used to match against another transaction request.

At operation 310, the original value is modified based on a predefined delay to create a modified value.

At operation 315, an entry is written to a data structure for the transaction request. Here, the entry includes a value field into which the modified value is placed when the entry is written. In an example, the value field is used to sort transaction requests in the data structure. In an example, writing the entry in the data structure for the transaction request includes writing true in a delay field of the entry.

At operation 320, the modified value in the value field of the entry is replaced with the original value in response to expiration of a time period based on the predefined delay. In an example, where the entry in the data structure had true written in the delay field of the entry, replacing the modified value in the value field of the entry with the original value in response to expiration of a time period based on the predefined delay includes writing false to the delay field of the entry.

At operation 325, the transaction request is matched to a second transaction request based on the value field of the entry. In an example, the modified value is less likely to match another transaction request than the original value. In an example, the original value is a first number, wherein the modified value is a second number, the second number being larger than the first number (e.g., a lower priority when trying to match lower numbers).

In an example, the second number is based on a delay number defined by the predefined delay. In an example, the second number is the delay number combined with the first number. In an example, the second number is the delay number. In an example, the delay number is computed from a constant and a metric derived from transaction requests in the data structure.

In an example, the transaction requests have one of two types. In this example, the metric derived from the transaction requests the data structure is one of two metrics that correspond to the two types. In an example, a first metric of the two metrics that corresponds to the first type of the two types is a maximum value of a value field for a transaction request of the second type of the two types. In an example, the constant is added to the first metric to produce the delay number.

In an example, a second metric of the two metrics that corresponds to the second type of the two types is a minimum value of a value field for a transaction request of the first type of the two types. In an example, the constant is subtracted from the second metric to produce the delay number.

At operation 330, the transaction is executed using the first transaction request and the second transaction request in response to matching the first transaction request to the second transaction request.

Figure 4:
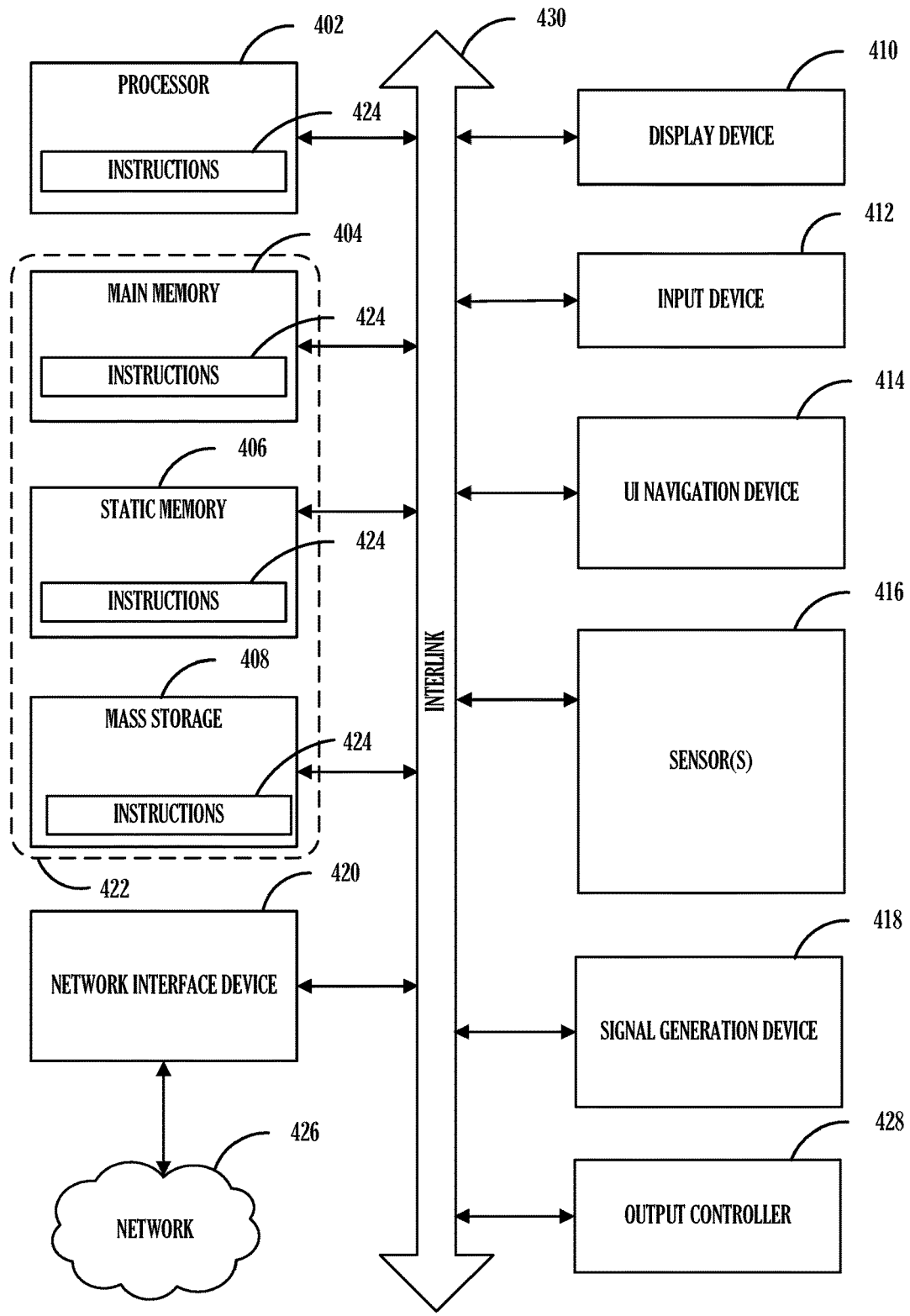
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. Examples, as described herein, may include, or may operate by, logic or a number of components, or mechanisms in the machine 400. Circuitry (e.g., processing circuitry) is a collection of circuits implemented in tangible entities of the machine 400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 400 follow.

In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 400 may include a hardware processor 402 (e.g., a central processing unit (CPU), a graphics processing unit (GPU), a hardware processor core, or any combination thereof), a main memory 404, a static memory (e.g., memory or storage for firmware, microcode, a basic-input-output (BIOS), unified extensible firmware interface (UEFI), etc.) 406, and mass storage 408 (e.g., hard drives, tape drives, flash storage, or other block devices) some or all of which may communicate with each other via an interlink (e.g., bus) 430. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 408, a signal generation device 418 (e.g., a speaker), a network interface device 420, and one or more sensors 416, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 402, the main memory 404, the static memory 406, or the mass storage 408 may be, or include, a machine readable medium 422 on which is stored one or more sets of data structures or instructions 424 (e.g., software) embodying or utilized by any one or more of the techniques or functions described herein. The instructions 424 may also reside, completely or at least partially, within any of registers of the processor 402, the main memory 404, the static memory 406, or the mass storage 408 during execution thereof by the machine 400. In an example, one or any combination of the hardware processor 402, the main memory 404, the static memory 406, or the mass storage 408 may constitute the machine readable media 422. While the machine readable medium 422 is illustrated as a single medium, the term "machine readable medium" may include a single medium or multiple media (e.g., a centralized or distributed database, or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read- Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 422 may be representative of the instructions 424, such as instructions 424 themselves or a format from which the instructions 424 may be derived. This format from which the instructions 424 may be derived may include source code, encoded instructions (e.g., in compressed or encrypted form), packaged instructions (e.g., split into multiple packages), or the like. The information representative of the instructions 424 in the machine readable medium 422 may be processed by processing circuitry into the instructions to implement any of the operations discussed herein. For example, deriving the instructions 424 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 424.

In an example, the derivation of the instructions 424 may include assembly, compilation, or interpretation of the information (e.g., by the processing circuitry) to create the instructions 424 from some intermediate or preprocessed format provided by the machine readable medium 422. The information, when provided in multiple parts, may be combined, unpacked, and modified to create the instructions 424. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 424 may be further transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software. A transmission medium is a machine readable medium.

ADDITIONAL EXAMPLES & NOTES

Example 1 is a device for delayed transaction matching, the device comprising: a memory including instructions; and processing circuitry that, when in operation, is configured by the instructions to: receive a first transaction request for a transaction, the first transaction request including an original value used to match against another transaction request; modify the original value based on a state of pending transaction requests to create a modified value that is less likely to match another transaction request; write an entry in a data structure for the transaction request, the data structure containing the pending transaction requests, the entry including a value field, the modified value being placed into the value field when the entry is written; replace the modified value in the value field of the entry with the original value in response to expiration of a time period based on a predefined delay; match the transaction request to a second transaction request based on the value field of the entry; and execute the transaction using the first transaction request and the second transaction request in response to matching the first transaction request to the second transaction request.

In Example 2, the subject matter of Example 1, wherein the value field is used to sort transaction requests in the data structure.

In Example 3, the subject matter of any of Examples 1-2, wherein the original value is a first number, wherein the modified value is a second number, the second number being a lower priority.

In Example 4, the subject matter of Example 3, wherein the second number includes a metric derived from pending transactions.

In Example 5, the subject matter of Example 4, wherein the second number is the metric combined with the first number.

In Example 6, the subject matter of any of Examples 3-5, wherein the second number is computed from a constant and a metric derived from transaction requests in the data structure.

In Example 7, the subject matter of Example 6, wherein transaction requests have one of two types, and wherein the metric derived from the transaction requests in the data structure is one of two metrics that correspond to the two types.

In Example 8, the subject matter of Example 7, wherein a first metric of the two metrics that corresponds to a first type of the two types is a maximum value of a value field for a transaction request of a second type of the two types.

In Example 9, the subject matter of Example 8, wherein the constant is added to the first metric to produce the second number.

In Example 10, the subject matter of any of Examples 8-9, wherein a second metric of the two metrics that corresponds to the second type of the two types is a minimum value of a value field for a transaction request of the first type of the two types.

In Example 11, the subject matter of Example 10, wherein the constant is subtracted from the second metric to produce the second number.

In Example 12, the subject matter of any of Examples 1-11, wherein, to write the entry in the data structure for the transaction request, the processing circuitry is configured to write true in a delay field of the entry.

In Example 13, the subject matter of Example 12, wherein, to replace the modified value in the value field of the entry with the original value in response to expiration of a time period based on the predefined delay, the processing circuitry is configured to write false to the delay field of the entry.

Example 14 is a method for delayed transaction matching, the method comprising: receiving a first transaction request for a transaction, the first transaction request including an original value used to match against another transaction request; modifying the original value based on a state of pending transaction requests to create a modified value that is less likely to match another transaction request; writing an entry in a data structure for the transaction request, the data structure containing the pending transaction requests, the entry including a value field, the modified value being placed into the value field when the entry is written; replacing the modified value in the value field of the entry with the original value in response to expiration of a time period based on a predefined delay; matching the transaction request to a second transaction request based on the value field of the entry; and executing the transaction using the first transaction request and the second transaction request in response to matching the first transaction request to the second transaction request.

In Example 15, the subject matter of Example 14, wherein the value field is used to sort transaction requests in the data structure.

In Example 16, the subject matter of any of Examples 14-15, wherein the original value is a first number, wherein the modified value is a second number, the second number being a lower priority.

In Example 17, the subject matter of Example 16, wherein the second number includes a metric derived from pending transactions.

In Example 18, the subject matter of Example 17, wherein the second number is the metric combined with the first number.

In Example 19, the subject matter of any of Examples 16-18, wherein the second number is computed from a constant and a metric derived from transaction requests in the data structure.

In Example 20, the subject matter of Example 19, wherein transaction requests have one of two types, and wherein the metric derived from the transaction requests in the data structure is one of two metrics that correspond to the two types.

In Example 21, the subject matter of Example 20, wherein a first metric of the two metrics that corresponds to a first type of the two types is a maximum value of a value field for a transaction request of a second type of the two types.

In Example 22, the subject matter of Example 21, wherein the constant is added to the first metric to produce the second number.

In Example 23, the subject matter of any of Examples 21-22, wherein a second metric of the two metrics that corresponds to the second type of the two types is a minimum value of a value field for a transaction request of the first type of the two types.

In Example 24, the subject matter of Example 23, wherein the constant is subtracted from the second metric to produce the second number.

In Example 25, the subject matter of any of Examples 14-24, wherein writing the entry in the data structure for the transaction request includes writing true in a delay field of the entry.

In Example 26, the subject matter of Example 25, wherein replacing the modified value in the value field of the entry with the original value in response to expiration of a time period based on the predefined delay includes writing false to the delay field of the entry.

Example 27 is a machine readable medium including instructions for delayed transaction matching, the instructions, when executed by processing circuitry, cause the processing circuitry to perform operations comprising: receiving a first transaction request for a transaction, the first transaction request including an original value used to match against another transaction request; modifying the original value based on a state of pending transaction requests to create a modified value that is less likely to match another transaction request; writing an entry in a data structure for the transaction request, the data structure containing the pending transaction requests, the entry including a value field, the modified value being placed into the value field when the entry is written; replacing the modified value in the value field of the entry with the original value in response to expiration of a time period based on a predefined delay; matching the transaction request to a second transaction request based on the value field of the entry; and executing the transaction using the first transaction request and the second transaction request in response to matching the first transaction request to the second transaction request.

In Example 28, the subject matter of Example 27, wherein the value field is used to sort transaction requests in the data structure.

In Example 29, the subject matter of any of Examples 27-28, wherein the original value is a first number, wherein the modified value is a second number, the second number being a lower priority.

In Example 30, the subject matter of Example 29, wherein the second number includes a metric derived from pending transactions.

In Example 31, the subject matter of Example 30, wherein the second number is the metric combined with the first number.

In Example 32, the subject matter of any of Examples 29-31, wherein the second number is computed from a constant and a metric derived from transaction requests in the data structure.

In Example 33, the subject matter of Example 32, wherein transaction requests have one of two types, and wherein the metric derived from the transaction requests in the data structure is one of two metrics that correspond to the two types.

In Example 34, the subject matter of Example 33, wherein a first metric of the two metrics that corresponds to a first type of the two types is a maximum value of a value field for a transaction request of a second type of the two types.

In Example 35, the subject matter of Example 34, wherein the constant is added to the first metric to produce the second number.

In Example 36, the subject matter of any of Examples 34-35, wherein a second metric of the two metrics that corresponds to the second type of the two types is a minimum value of a value field for a transaction request of the first type of the two types.

In Example 37, the subject matter of Example 36, wherein the constant is subtracted from the second metric to produce the second number.

In Example 38, the subject matter of any of Examples 27-37, wherein writing the entry in the data structure for the transaction request includes writing true in a delay field of the entry.

In Example 39, the subject matter of Example 38, wherein replacing the modified value in the value field of the entry with the original value in response to expiration of a time period based on the predefined delay includes writing false to the delay field of the entry.

Example 40 is a system for delayed transaction matching, the system comprising: means for receiving a first transaction request for a transaction, the first transaction request including an original value used to match against another transaction request; means for modifying the original value based on a state of pending transaction requests to create a modified value that is less likely to match another transaction request; means for writing an entry in a data structure for the transaction request, the data structure containing the pending transaction requests, the entry including a value field, the modified value being placed into the value field when the entry is written; means for replacing the modified value in the value field of the entry with the original value in response to expiration of a time period based on a predefined delay; means for matching the transaction request to a second transaction request based on the value field of the entry; and means for executing the transaction using the first transaction request and the second transaction request in response to matching the first transaction request to the second transaction request.

In Example 41, the subject matter of Example 40, wherein the value field is used to sort transaction requests in the data structure.

In Example 42, the subject matter of any of Examples 40-41, wherein the original value is a first number, wherein the modified value is a second number, the second number being a lower priority.

In Example 43, the subject matter of Example 42, wherein the second number includes a metric derived from pending transactions.

In Example 44, the subject matter of Example 43, wherein the second number is the metric combined with the first number.

In Example 45, the subject matter of any of Examples 42-44, wherein the second number is computed from a constant and a metric derived from transaction requests in the data structure.

In Example 46, the subject matter of Example 45, wherein transaction requests have one of two types, and wherein the metric derived from the transaction requests in the data structure is one of two metrics that correspond to the two types.

In Example 47, the subject matter of Example 46, wherein a first metric of the two metrics that corresponds to a first type of the two types is a maximum value of a value field for a transaction request of a second type of the two types.

In Example 48, the subject matter of Example 47, wherein the constant is added to the first metric to produce the second number.

In Example 49, the subject matter of any of Examples 47-48, wherein a second metric of the two metrics that corresponds to the second type of the two types is a minimum value of a value field for a transaction request of the first type of the two types.

In Example 50, the subject matter of Example 49, wherein the constant is subtracted from the second metric to produce the second number.

In Example 51, the subject matter of any of Examples 40-50, wherein the means for writing the entry in the data structure for the transaction request include means for writing true in a delay field of the entry.

In Example 52, the subject matter of Example 51, wherein the means for replacing the modified value in the value field of the entry with the original value in response to expiration of a time period based on the predefined delay include means for writing false to the delay field of the entry.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A non-transitory machine readable medium including instructions for delayed transaction matching, the instructions, when executed by processing circuitry, cause the processing circuitry to perform operations comprising:
receiving a first transaction request for a transaction, the first transaction request including an original value used to match against another transaction request;
modifying the original value based on a state of pending transaction requests to create a modified value that is less likely to match another transaction request;
writing an entry in a data structure for the transaction request, the data structure containing the pending transaction requests, the entry including a value field, the modified value being placed into the value field when the entry is written;
replacing the modified value in the value field of the entry with the original value in response to expiration of a time period based on a predefined delay;
matching the transaction request to a second transaction request based on the value field of the entry; and
executing the transaction using the first transaction request and the second transaction request in response to matching the first transaction request to the second transaction request.

2. The non-transitory machine readable medium of claim 1, wherein the value field is used to sort transaction requests in the data structure.

3. The non-transitory machine readable medium of claim 1, wherein the original value is a first number, wherein the modified value is a second number, the second number being a lower priority.

4. The non-transitory machine readable medium of claim 3, wherein the second number includes a metric derived from pending transactions.

5. The non-transitory machine readable medium of claim 4, wherein the second number is the metric combined with the first number.

6. The non-transitory machine readable medium of claim 3, wherein the second number is computed from a constant and a metric derived from transaction requests in the data structure.

7. The non-transitory machine readable medium of claim 6, wherein transaction requests have one of two types, and wherein the metric derived from the transaction requests in the data structure is one of two metrics that correspond to the two types.

8. The non-transitory machine readable medium of claim 7, wherein a first metric of the two metrics that corresponds to a first type of the two types is a maximum value of a value field for a transaction request of a second type of the two types.

9. The non-transitory machine readable medium of claim 8, wherein the constant is added to the first metric to produce the second number.

10. The non-transitory machine readable medium of claim 8, wherein a second metric of the two metrics that corresponds to the second type of the two types is a minimum value of a value field for a transaction request of the first type of the two types.

11. The non-transitory machine readable medium of claim 10, wherein the constant is subtracted from the second metric to produce the second number.

12. The non-transitory machine readable medium of claim 1, wherein writing the entry in the data structure for the transaction request includes writing true in a delay field of the entry.

13. The non-transitory machine readable medium of claim 12, wherein replacing the modified value in the value field of the entry with the original value in response to expiration of a time period based on the predefined delay includes writing false to the delay field of the entry.

14. A method for delayed transaction matching, the method comprising:
receiving a first transaction request for a transaction, the first transaction request including an original value used to match against another transaction request;
modifying the original value based on a state of pending transaction requests to create a modified value that is less likely to match another transaction request;
writing an entry in a data structure for the transaction request, the data structure containing the pending transaction requests, the entry including a value field, the modified value being placed into the value field when the entry is written;
replacing the modified value in the value field of the entry with the original value in response to expiration of a time period based on a predefined delay;
matching the transaction request to a second transaction request based on the value field of the entry; and
executing the transaction using the first transaction request and the second transaction request in response to matching the first transaction request to the second transaction request.

15. The method of claim 14, wherein the value field is used to sort transaction requests in the data structure.

16. The method of claim 14, wherein the original value is a first number, wherein the modified value is a second number, the second number being a lower priority.

17. The method of claim 16, wherein the second number includes a metric derived from pending transactions.

18. The method of claim 17, wherein the second number is the metric combined with the first number.

19. The method of claim 16, wherein the second number is computed from a constant and a metric derived from transaction requests in the data structure.

20. The method of claim 19, wherein transaction requests have one of two types, and wherein the metric derived from the transaction requests in the data structure is one of two metrics that correspond to the two types.

21. The method of claim 20, wherein a first metric of the two metrics that corresponds to a first type of the two types is a maximum value of a value field for a transaction request of a second type of the two types.

22. The method of claim 21, wherein the constant is added to the first metric to produce the second number.

23. The method of claim 21, wherein a second metric of the two metrics that corresponds to the second type of the two types is a minimum value of a value field for a transaction request of the first type of the two types.

24. The method of claim 23, wherein the constant is subtracted from the second metric to produce the second number.

25. The method of claim 14, wherein writing the entry in the data structure for the transaction request includes writing true in a delay field of the entry.

26. The method of claim 25, wherein replacing the modified value in the value field of the entry with the original value in response to expiration of a time period based on the predefined delay includes writing false to the delay field of the entry.

\* \* \* \* \*